US012771056B2

(12) United States Patent
Tomura

(10) Patent No.: US 12,771,056 B2
(45) Date of Patent: Oct. 20, 2026

(54) ELECTRICAL CONNECTOR AND ELECTRICAL CONNECTOR STACK

(71) Applicant: Tyco Electronics Japan G.K., Kawasaki (JP)

(72) Inventor: Daiki Tomura, Kanagawa (JP)

(73) Assignee: TE CONNECTIVITY JAPAN G.K., Kawasaki (JP)

( * ) Notice: Subject to any disclaimer, the term of this patent is extended or adjusted under 35 U.S.C. 154(b) by 485 days.

(21) Appl. No.: 18/365,491

(22) Filed: Aug. 4, 2023

(65) Prior Publication Data

US 2023/0396013 A1 Dec. 7, 2023

Related U.S. Application Data

(63) Continuation of application No. PCT/JP2022/003717, filed on Feb. 1, 2022.

(30) Foreign Application Priority Data

Feb. 4, 2021 (JP) ................................ 2021-016213

(51) Int. Cl.

| | |
|---|---|
| ***H01R 13/502*** | (2006.01) |
| ***H01R 13/627*** | (2006.01) |
| ***H01R 13/631*** | (2006.01) |

(52) U.S. Cl.

CPC ....... *H01R 13/502* (2013.01); *H01R 13/6272* (2013.01); *H01R 13/631* (2013.01)

(58) Field of Classification Search

CPC .............. H01R 13/4364; H01R 13/514; H01R 13/4223; H01R 13/506; H01R 13/42;

(Continued)

(56) References Cited

U.S. PATENT DOCUMENTS 5,460,550 A 10/1995 Okayasu et al.
5,947,775 A * 9/1999 Yamamoto ........... H01R 13/501 439/752

(Continued)

FOREIGN PATENT DOCUMENTS

JP H0719964 U 4/1995
JP 20080130511 A 6/2008

(Continued)

OTHER PUBLICATIONS

Japanese Notice of Reasons for Refusal dated Jul. 9, 2024 with English translation, corresponding to Application No. 2021-016213, 9 pages.

(Continued)

*Primary Examiner* — Anthony R Jimenez

(57) ABSTRACT

An electrical connector comprises a terminal and a housing. The terminal includes a terminal portion extending in a mating direction in which the terminal is mated with a mating terminal, and an electrical wire joining portion extending rearward behind the terminal portion and adapted to be joined to an electrical wire. The housing includes a (Continued)

cavity receiving the terminal therein along the mating direction with a front end of the terminal facing frontward, and a wall supporting the terminal. A catching portion of the housing protrudes into the cavity and secures the terminal within the cavity. The housing defines an opening formed opposite to the catching portion in a protruding direction of the catching portion.

18 Claims, 9 Drawing Sheets

(58) Field of Classification Search
CPC .... H01R 31/08; H01R 13/502; H01R 13/627; H01R 13/631
See application file for complete search history.

(56) References Cited

U.S. PATENT DOCUMENTS

| | | | | |
|---|---|---|---|---|
| 8,118,609 | B2 | 2/2012 | Sasaki et al. | |
| 8,747,168 | B2 | 6/2014 | Klda | |
| 2007/0072471 | A1* | 3/2007 | Miyakawa ............. | H01R 43/22 439/274 |
| 2012/0083149 | A1 | 4/2012 | Uchida | |
| 2015/0099404 | A1 | 4/2015 | Iida | |
| 2020/0144755 | A1 | 5/2020 | Matsuura | |

FOREIGN PATENT DOCUMENTS

| | | | | |
|---|---|---|---|---|
| JP | 2010073531 | A | 4/2010 | |
| JP | 2011071061 | A | 4/2011 | |
| JP | 2012079552 | A | 4/2012 | |
| JP | 2012113853 | A | 6/2012 | |
| JP | 20120186001 | A | 9/2012 | |
| JP | 5608406 | B2 * | 10/2014 | ......... H01R 13/4362 |
| JP | 201572868 | A | 4/2015 | |
| JP | 2020072050 | A | 5/2020 | |

OTHER PUBLICATIONS

Japanese International Search Report and Written Opinion dated Apr. 12, 2022, with English translation thereof, corresponding to Application No. PCT/JP2022/003717, 7 pages.
Japanese Inquiry of History Information dated Oct. 29, 2024 with English translation, corresponding to Application No. 2021-016213, 9 pages.

* cited by examiner

ELECTRICAL CONNECTOR AND ELECTRICAL CONNECTOR STACK

CROSS-REFERENCE TO RELATED APPLICATIONS

This application claims the benefit of Japanese Patent Application No. 2022/003717, filed Jan. 2, 2022, which claims priority to Japanese Patent Application No. 2021/016213, filed Feb. 4, 2021, the whole disclosures of which are incorporated herein by reference.

FIELD OF THE INVENTION

Embodiments of the present disclosure relate to an electrical connector including a terminal and a connector housing accommodating the terminal, and a stack or assembly of said electrical connectors.

BACKGROUND

Electrical connectors provided with a terminal having an electrical wire connected thereto and a housing accommodating and catching the terminal are used for various purposes.

Typically, the terminal is plugged into a cavity of the housing, with the connected electrical wire led out rearwardly, and is caught or secured therein via a lance provided in the housing. The lance may be cantilevered and protrudes into the cavity. Once the terminal climbs over or passes the lance frontward while deflecting the lance, the terminal is captured by the lance.

In order to assemble the terminal within the housing while plugging into the cavity the electrical wire led out from the terminal, the buckling load of the electrical wire is required to be greater than a force required for plugging the terminal thereinto while deflecting the lance. Accordingly, ff a thin electrical wire is employed in the connector, it is difficult to establish the condition of the terminal plugging force being less than the electrical wire buckling load. This is particularly problematic considering the growing demands for lightened, downsized, and high-density mounted equipment.

An object of the present disclosure includes providing an electrical connector that enables a terminal to be assembled within a housing despite the terminal having a thin electrical wire connected thereto, and a stack or assembly of said electrical connectors.

SUMMARY

According to an embodiment of the present disclosure, an electrical connector comprises a terminal and a housing. The terminal includes a terminal portion extending in a mating direction in which the terminal is mated with a mating terminal, and an electrical wire joining portion extending rearward behind the terminal portion and adapted to be joined to an electrical wire. The housing includes a cavity receiving the terminal therein along the mating direction with a front end of the terminal facing frontward, and a wall supporting the terminal. A catching portion of the housing protrudes into the cavity and secures the terminal within the cavity. The housing defines an opening formed opposite to the catching portion in a protruding direction of the catching portion.

BRIEF DESCRIPTION OF THE DRAWINGS

The invention will now be described by way of example with reference to the accompanying Figures, of which.

DETAILED DESCRIPTION OF THE EMBODIMENTS

Figure 1:
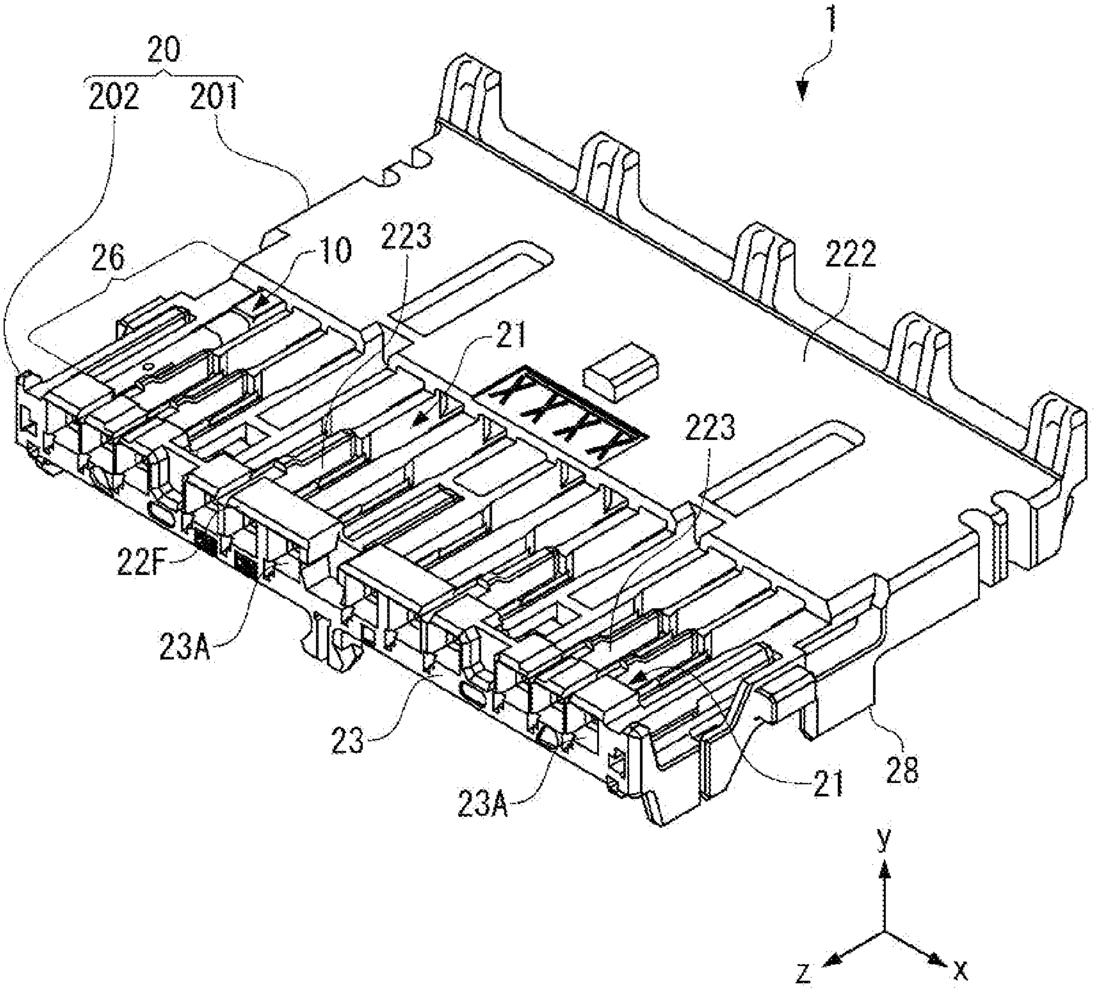
FIG. 1 is a bottom isometric view of an electrical connector according to an embodiment of the present invention, wherein a lid had been removed from a main body of a housing.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 2A:
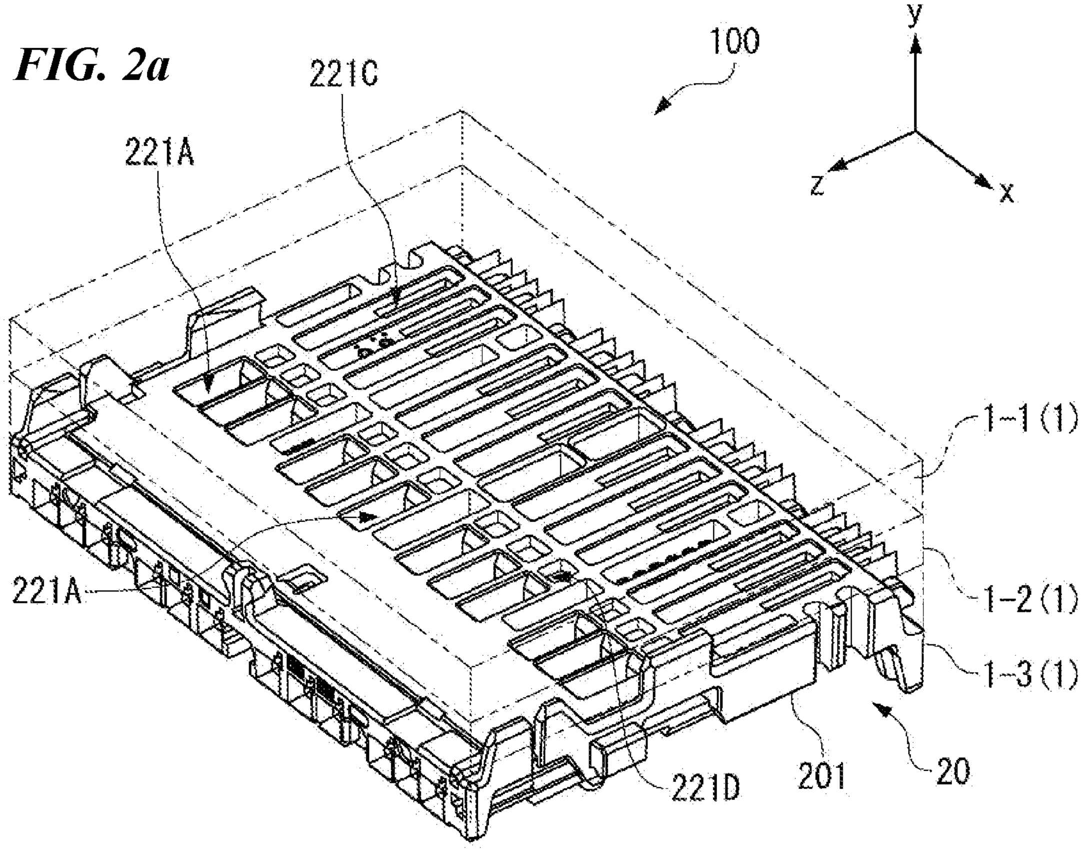
FIG. 2*a* is a top isometric view of a stack of the electrical connectors shown in FIG. 1. The shape of the electrical connector in a lowermost layer of the stack is shown.
Figure 3:
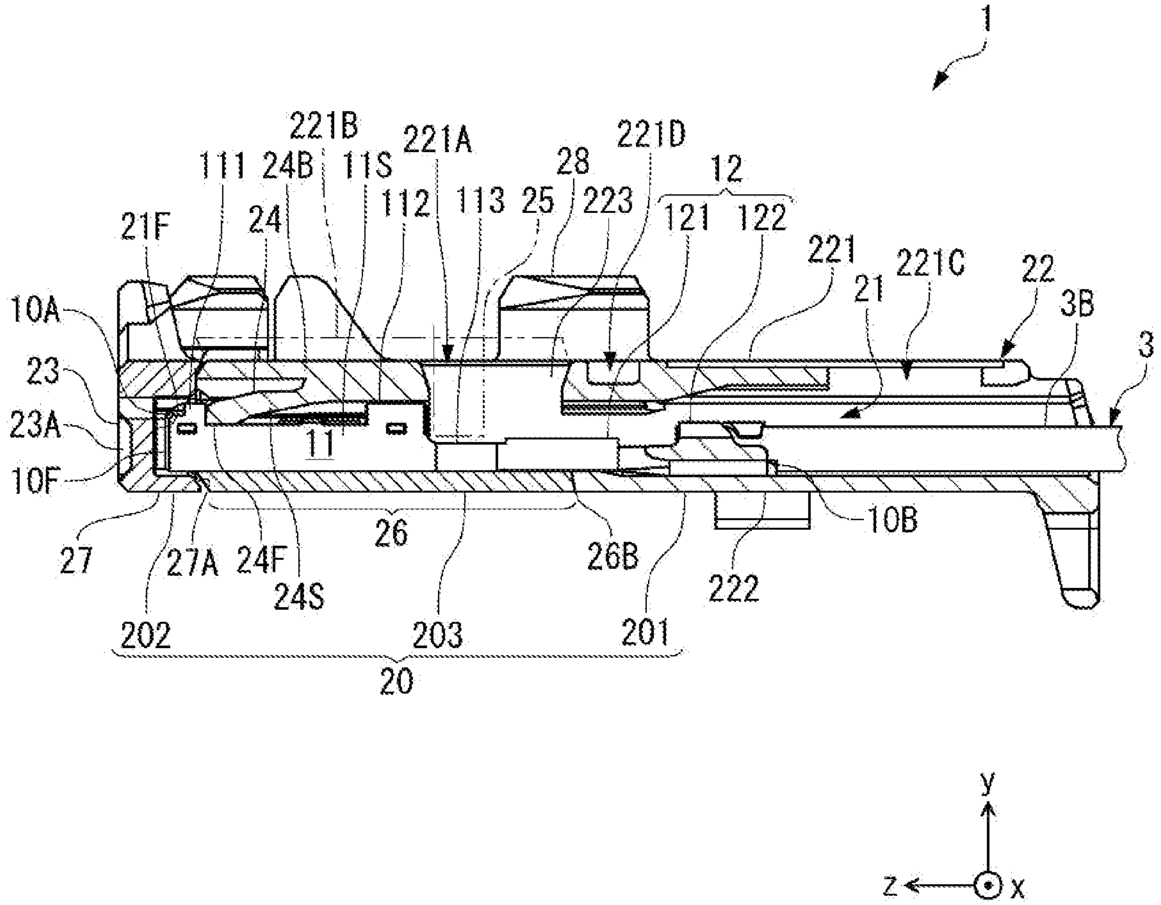
FIG. 3 is a vertical sectional view of the electrical connector shown in FIG. 1.

An electrical connector 1 of the present disclosure may be used individually, as shown in FIG. 1, or used in a stack or an assembly, as shown in FIG. 2*a*. FIG. 1 shows the electrical connector 1 from below, and FIG. 2*a* shows a stack 100 comprising of a plurality of the electrical connectors 1 from above. The electrical connectors 1 in respective layers of the stack 100 are configured to be substantially similar to each other. The electrical connector 1 is provided with a plurality of terminals 10 and a housing 20 accommodating these terminals 10, as shown in FIGS. 1 and 3. The terminal 10 of a female type provided in the electrical connector 1 is mated with a mating terminal of a male type provided in a mating connector. As described herein, a side on which the terminal 10 is mated with the mating terminal is defined as “front”, and the opposite side, a side on which an electrical wire 3 is led out from the terminal, is defined as “rear”. In addition, “upper” and “lower” refer to an “upper side” and a “lower side” as shown in FIG. 3.

<Terminal>

Figure 4:
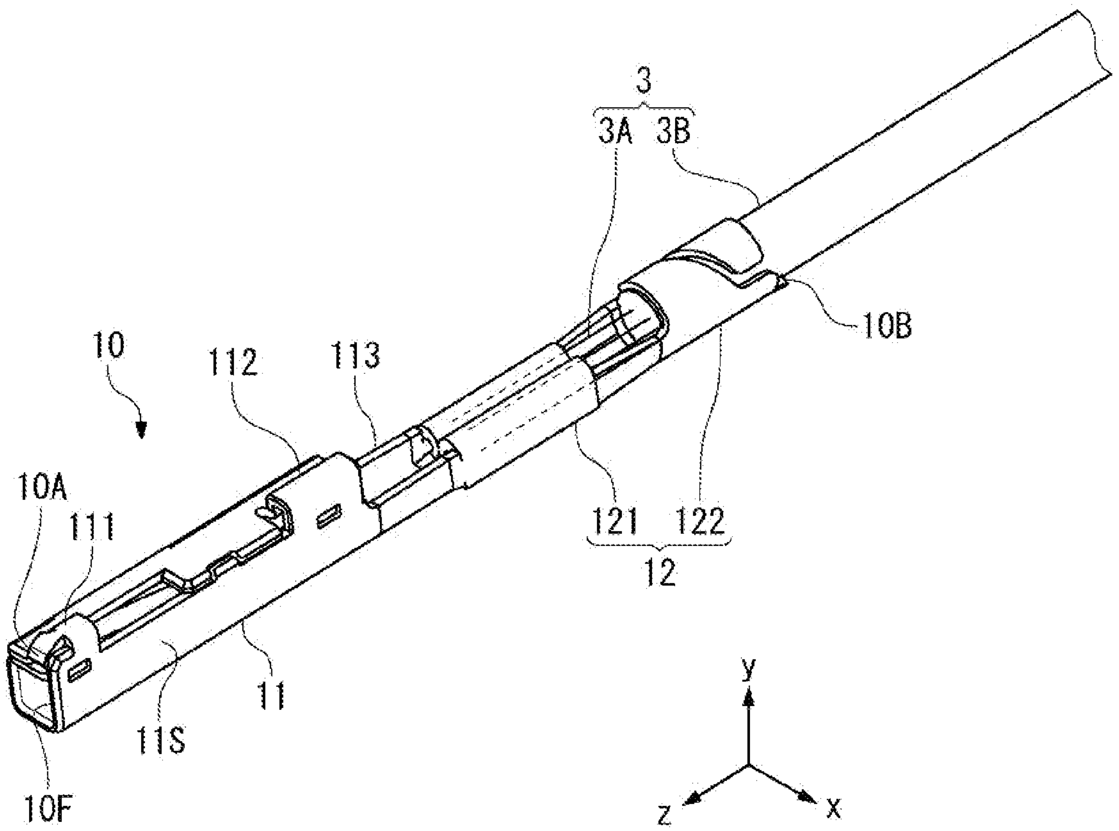
FIG. 4 is an isometric view of a terminal provided in each of the electrical connectors.

The terminal 10 is provided with a terminal portion 11 mated with the mating terminal, and an electrical wire joining portion 12 having the electrical wire 3 joined thereto behind the terminal portion 11, as shown in FIGS. 3 and 4. The terminal 10 can be formed, for example by stamping and forming a sheet composed of a metal material such as an aluminum alloy. The terminal portion 11 extends in a mating direction z in which it is mated with the mating terminal. A contact portion is provided inside the terminal portion 11, and is adapted to come into contact with the mating terminal to provide electrical continuity therewith. The mating direction z is equivalent to a longitudinal direction. The terminal 11 is formed, for example in a box shape having a rectangular cross section. The terminal portion 11 receives therein the mating terminal, for example having a tab-like or pin-like shape.

The terminal portion 11 is provided with a first, or primary, latch or catch portion 111, and a second, or secondary, latch or catch portion 112. The primary catch and the secondary catch restrain the terminal 10 from being released rearward from the cavity 21. As will be described herein, the secondary catch 112 is engaged by another electrical connector 1 or another element positioned on the top or upper side of the electrical connector 1. The first catch portion 111 protrudes upward from a sidewall 11S of the terminal portion 11 at a front end of the terminal portion. The second catch portion 112 protrudes upward from the sidewall 11S behind the first catch portion 111. A wall 113 lower than the sidewall 11S is formed on a rear side of the second catch portion 112.

The electrical wire joining portion 12 is continuous in a rearward direction from the terminal portion 11, and extends along the mating direction z. The electrical wire 3 comprises a relatively thin wire a having small diameter, and is joined by crimping to the electrical wire joining portion 12. The electrical wire joining portion 12 is provided with a core joining portion 121 having a core 3A of the electrical wire 3 crimped thereto, and an insulation joining portion 122 having an insulation 3B covering the core crimped thereto. The electrical wire 3 is joined to the electrical wire joining portion 12, and led out rearwardly from the electrical wire joining portion along the mating direction z, prior to assembly of the terminal 10 to the housing 20.

<Housing>

The housing 20 will be described with reference to FIGS. 1, 3 and 5. The housing 20 accommodates the terminal 10 and a portion of the electrical wire 3 joined to the terminal 10, and catches or secures the terminal 10 therewithin. The housing 20 can be formed by injection molding using an insulating resin material, by way of example. The housing 20 is provided with a plurality of cavities 21 individually accommodating the terminals 10 having the electrical wires 3 joined thereto. Each terminal 10 is plugged into each cavity 21 with its front end 10F facing frontward or forward, typically along the mating direction z. The plurality of cavities 21 in the housing 20 are arranged in a lateral direction x that is perpendicular to both the mating direction z and a vertical direction y.

Figure 5:
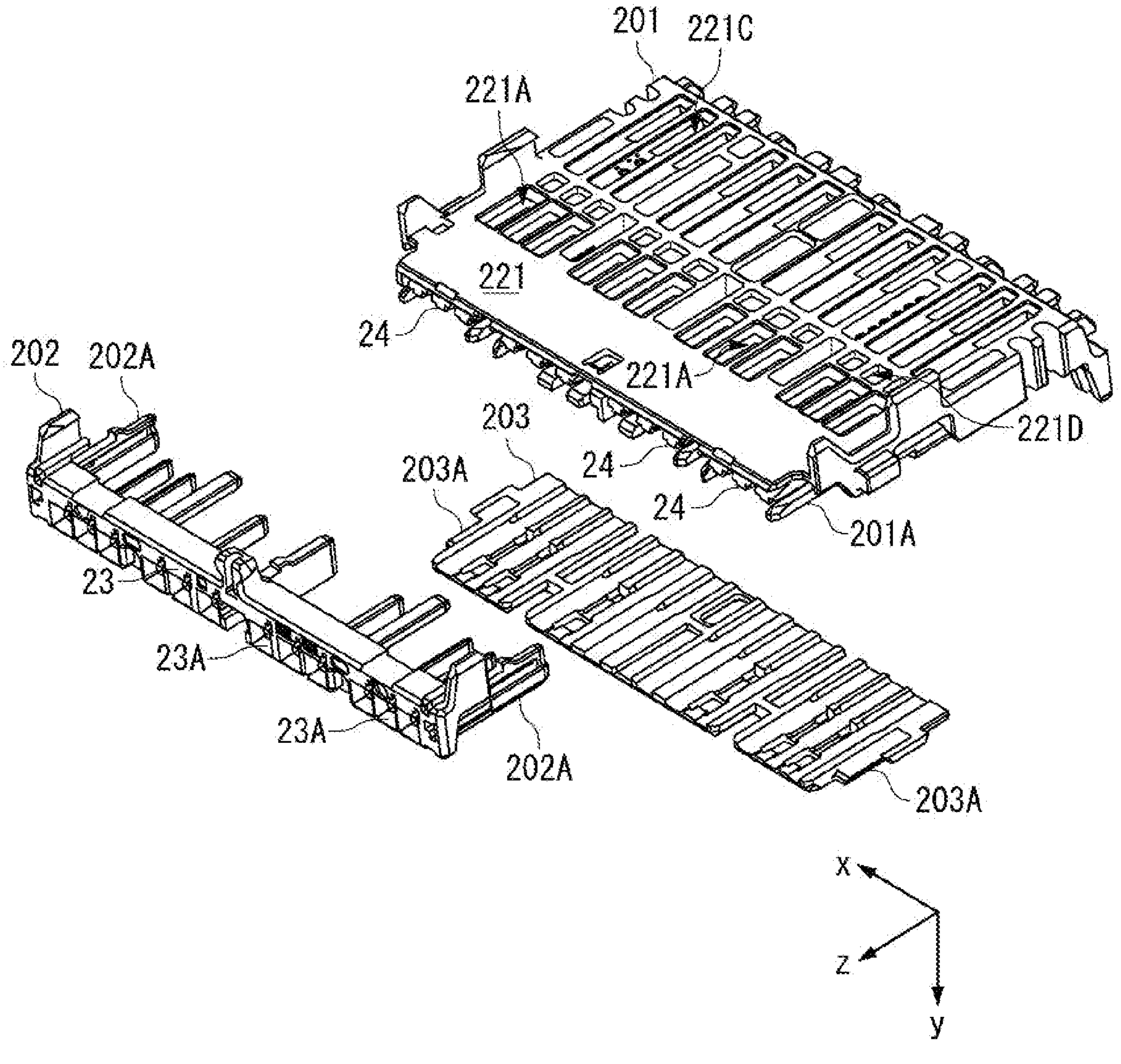
FIG. 5 is an exploded top isometric view showing of the electrical connector of FIG. 3.

The housing 20 includes a housing main body 201 (first housing) and a housing front portion 202 (second housing), as shown in FIGS. 3 and 5. The housing 20 is divided into the housing main body 201 and the housing front portion 202 separate from the housing main body 201, in order to facilitate mold release in an injection molding process thereof. It should be noted that this may not necessarily apply to all specific shapes and mold configurations of the housing 20, and the housing main body 201 and the housing front portion 202 may be integrally formed with one another. Alternatively, the housing 20 may also be divided into three or more elements. The electrical connector 1 shown in FIG. 3 may be used alone, or arranged in a lowermost layer (1-3) of the stack 100, as shown in FIG. 2*a*.

This electrical connector 1 is provided with a lid 203 attached to the housing main body 201 and the housing front portion 202. The housing main body 201, the housing front portion 202, and the lid 203, as a whole, are provided with the cavity 21, a wall 22 supporting the terminal 10 and the electrical wire 3 accommodated in the cavity 21, a front wall 23 forming a front end 21F of the cavity 21, and a lance 24 as a catch portion protruding into the cavity from the wall 22 and catching the terminal.

The terminal 10 and the electrical wire 3 are accommodated in the cavity 21 from the front end 10F of the terminal 10 at least to a rear end of the electrical wire joining portion 12. The cavity 21 of the present embodiment is longer in the mating direction z than the length of the terminal 10. Therefore, the insulation 3B of the wire 3 led out rearward from the electrical wire joining portion 12 is also at least partially accommodated in the cavity 21.

The wall 22 forming the cavity 21 is provided with an upper wall 221, a lower wall 222, and separating walls 223 separating the cavities arranged in the lateral direction x from each other. The terminal 10 and the electrical wire 3 are generally enclosed on four sides by the upper wall 221, the lower wall 222, and the separating walls 223. The upper wall 221 is continuous in the lateral direction x in which the cavities 21 are arranged. This also applies to the lower wall 222.

The lances or latches 24 protrude into the plurality of cavities 21, respectively, from a generally front region in the upper wall 221 and catch the terminals 10 individually in the respective cavities. Each lance 24 protrudes downward from the upper wall 221, and extends frontward as a cantilever. When the terminal 10 is assembled into the housing 20, the lance 24 can be pressed from behind and elastically deformed by the terminal. A free end 24F (front end) of the lance 24 catches the first catch portion 111 of the terminal 10 from behind.

The upper wall 221 has an opening 221A for the secondary catch 112 formed therein that passes through the upper wall 221 in the vertical direction y behind the lance 24, as shown in FIGS. 3 and 5. This opening 221A for the secondary catch receives a second catching portion 25 (indicated by a long dashed double-short dashed line in FIG. 3) formed on the housing 20 of an electrical connector 1-2

Figure 2B:
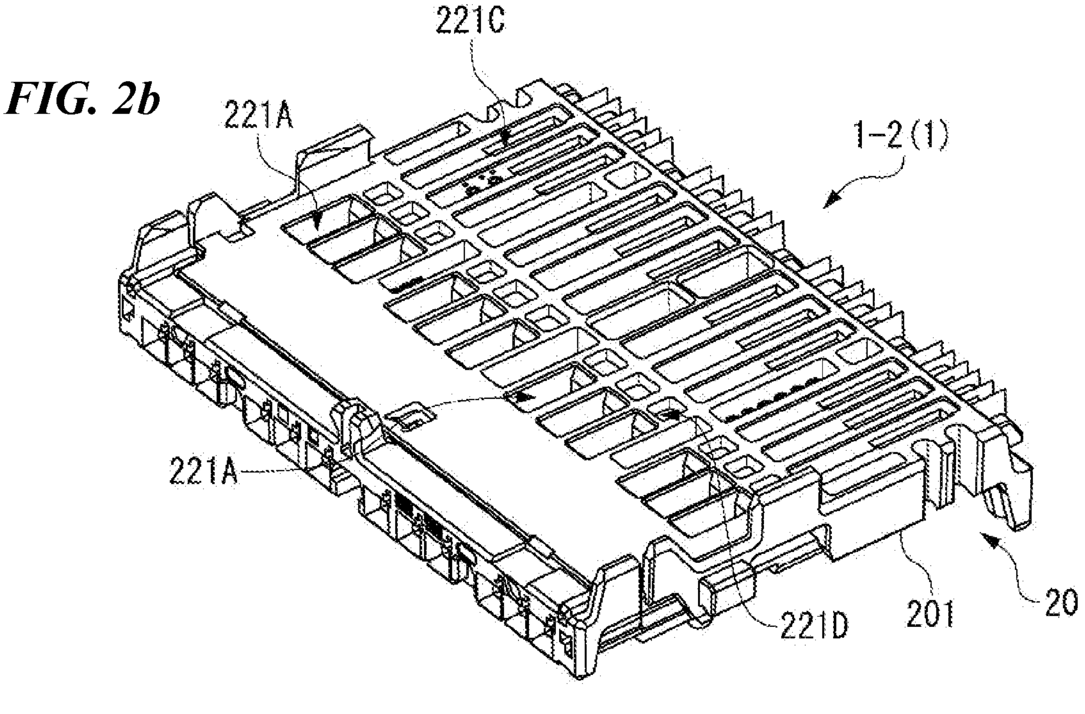
FIG. 2*b* is an isometric view showing the electrical connector in an intermediate layer of the stack of FIG. 2*a*.

(see FIG. 2*b*) forming a layer adjacent to an electrical connector 1-3 (FIG. 2*a*) having this opening 221A formed therein. In an alternative embodiment, the opening 221A receives a second catching portion formed on another element. Once being plugged into the cavity 21 through the opening 221A for the secondary catch 112 and positioned above the wall 113 of the terminal portion 11, the second catching portion 25 catches the second caught portion from behind. The openings 221A for the secondary catching 112 are individually formed in the plurality of cavities 21, respectively. As long as the rigidity of the housing 20 permits, a single opening 221A for the secondary catching 112 may be formed that extends over an area across the plurality of cavities 21 in the lateral direction x.

It should be understood that the upper wall 221 defines a locating depression 221D (FIGS. 2*a* and 2*b*, 3) therein into which a protrusion of the electrical connector 1 stacked thereon is plugged. In one embodiment, it is preferred that the upper wall 221 have a plurality of the depressions 221D formed therein at positions corresponding to the plurality of cavities 21, respectively. In addition, a hole 221C is formed in a rear end side of the upper wall 221 and is adapted to provide visibility of the electrical wire 3 therethrough.

An opening or opening region 26 passing through the lower wall 222 in the vertical direction y is formed in a front side of the lower wall 222, as shown in FIGS. 1 and 3. The opening region 26 and the lance 24 are opposite to each other in a protruding direction of the lance 24 (the vertical direction y). The opening region 26 is equivalent to a space where the lower wall 222 is not present. On one embodiment, the opening region 26 extends at least over an area corresponding to from the free end 24F of the lance 24 to a supporting end 24B. The opening region 26 enables the terminal 10 having the thin electrical wire 3 connected thereto to be assembled to the housing 20. Before the opening region 26 is closed by the lid 203, the cavity 21 is opened outside thereof through the opening region.

Figure 6A:
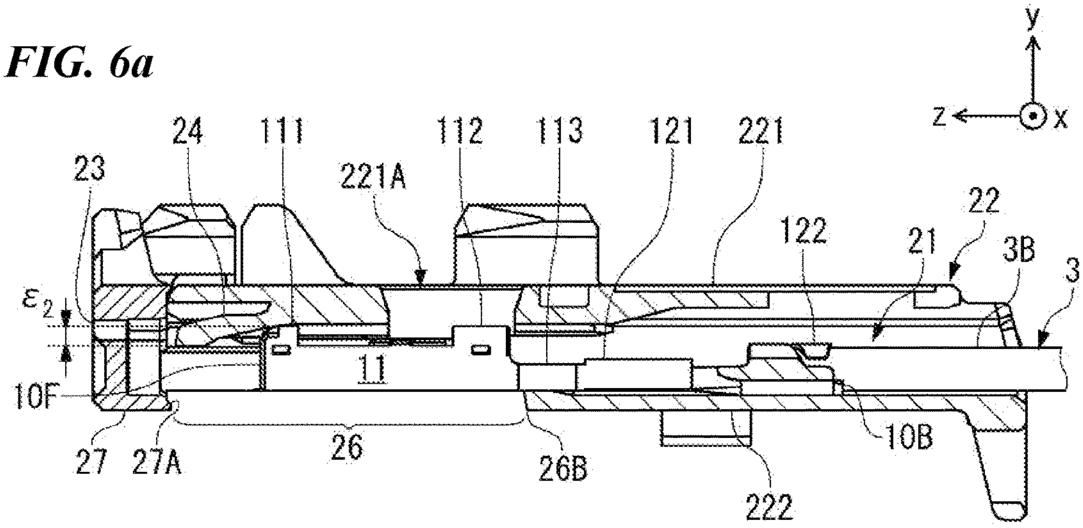
FIG. 6*a* is a diagram showing a step of an exemplary assembly process including plugging the terminal having an electrical wire joined thereto into the housing.
Figure 6B:
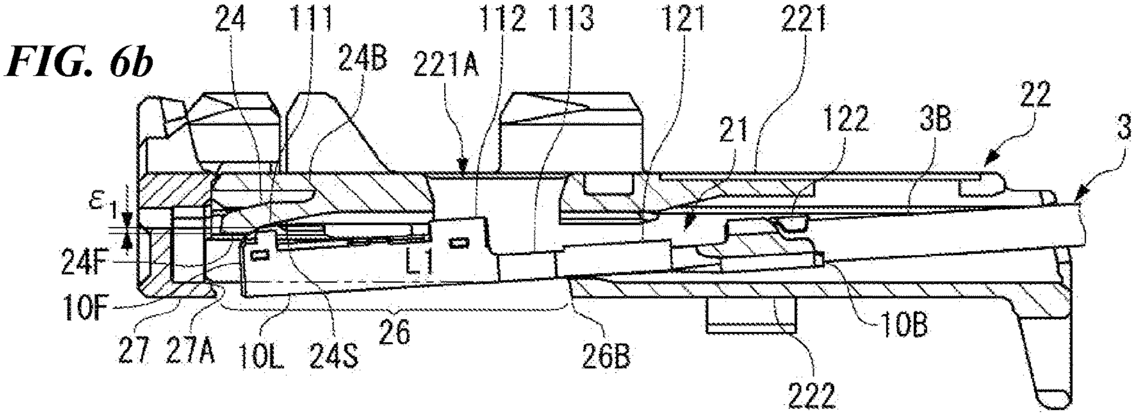
FIG. 6*b* is a diagram showing a step of the exemplary assembly process including plugging the terminal having an electrical wire joined thereto into the housing.

As shown in FIG. 6*b*, the opening region 26 allows the terminal 10 having come into contact with a slope 24S of the lance 24 from behind to be displaced inclinedly with respect to the mating direction z. At this time, a portion of the terminal 10 inclined is positioned in the opening region 26. The opening region 26 of the present embodiment extends over an area across the plurality of cavities 21 in the lateral direction x. The opening region 26 may be formed individually for each of the plurality of cavities 21.

The lid 203 closes at least a portion of the opening region 26. As shown in FIGS. 3 and 5, the lid 203 closes the opening region 26 at least over its entire area in a planar direction. The opening region 26 may not necessarily be closed over its entire area, as long as at least an area in the opening region that is opposite to the free end 24F of the lance 24 is closed. In addition, it is preferred that the lid 203 be plugged into the opening region 26 from below and occupy at least a portion of the opening region in a plate thickness direction. For this reason, the lid 203 is so formed to have an outer shape corresponding to a planar shape of the opening region 26, and has a part positioned in the space of the opening region. The lid 203 of the present embodiment is formed in a substantially rectangular shape, similarly to the opening region 26, and is given a thickness equivalent to the plate thickness of the lower wall 222.

Figure 7A:
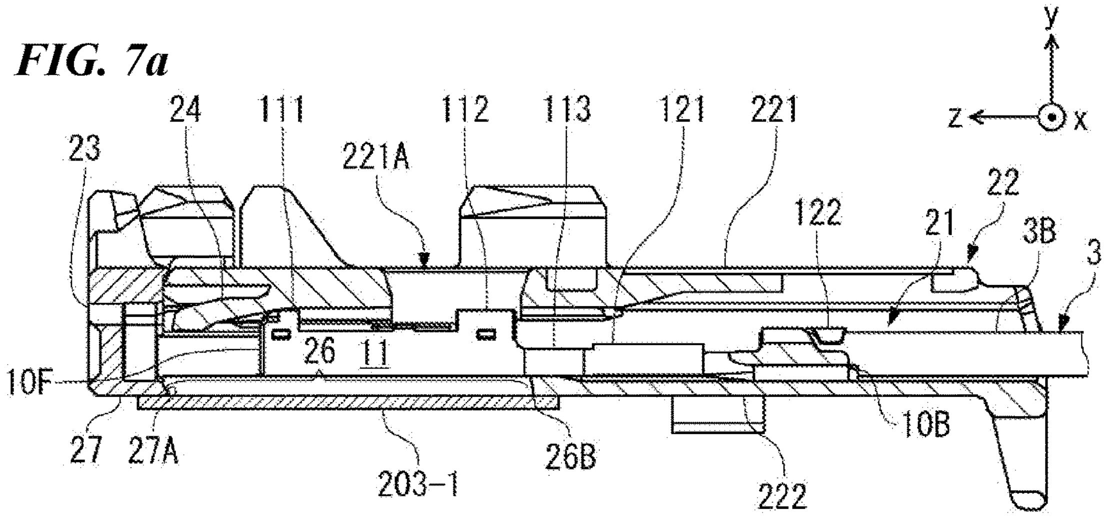
FIG. 7*a* is a diagram showing modifications of the lid that closes an opening region of the housing.
Figure 7B:
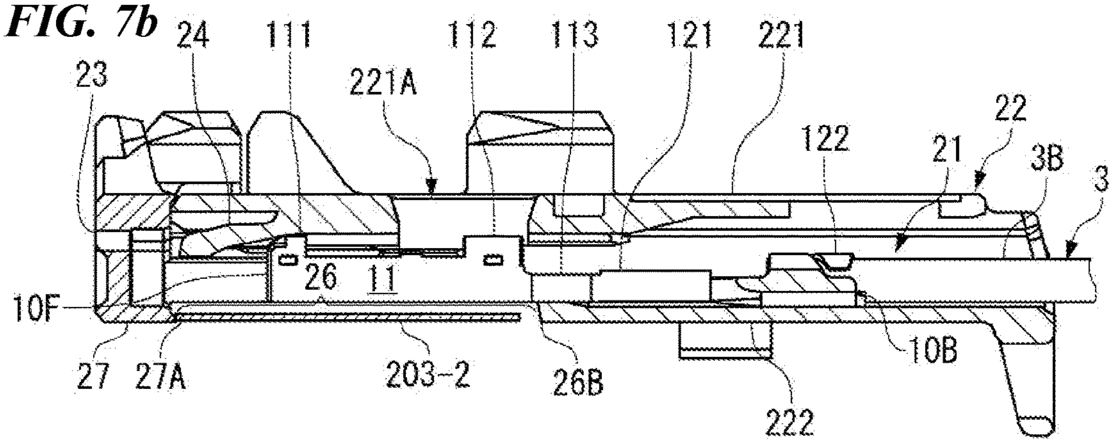
FIG. 7*b* is a diagram showing modifications of the lid that closes an opening region of the housing.

The lid 203 of the present embodiment has an upper face side and a lower face side both positioned flush with the lower wall 222. However, the lid 203 may be positioned on a lower face of the lower wall 222 and close the opening region 26, like a lid 203-1 shown in FIG. 7*a*. A lid 203-2 may also be included that is attached to the lower wall 222 with a portion of the opening region 26 in the planar direction left, and that occupies only a portion of the opening region 26 in the plate thickness direction, as shown in FIG. 7*b*. Once the lid 203 is integrated with the housing main body 201 and the housing front portion 202, the lid 203 constitutes a portion of the lower wall 222.

The lower wall 222 is formed generally flat as a whole, though being so depressed and raised as to follow the outer shape of the terminal 10 (see FIG. 5), over the housing main body 201, the housing front portion 202, and the lid 203 as a whole. Once the terminal 10 is plugged into the cavity 21 and caught by the lance 24, the terminal 10 is stably accommodated between the upper wall 221 and the lower wall 222. With the terminal 10 stably supported by the lower wall 222, it is preferred that the lid 203 do not protrude upward beyond the surroundings of the lid 203. For this purpose, the plate thickness of the lid 203 is set to be not more than the plate thickness of the lower wall 222.

If the electrical connector 1 shown in FIG. 3 is the lowermost electrical connector 1-3 of the stack 100 (FIG. 2*a*), and another electrical connector 1-2 (FIG. 2*b*) is stacked on the electrical connector 1-3, the opening region 26 of the electrical connector 1-2 is closed at least in the planar direction by the upper wall 221 of the lower electrical connector 1-3, as indicated by a long dashed/short dashed line in FIG. 3. A closing part 221B that is plugged into the opening region 26 and occupies at least a portion of the opening region 26 is provided on the upper wall 221 of the electrical connector 1-3. That is, the lid 203 may not necessarily be attached to the housing 20 of the electrical connector 1-2 in order to close the opening region 26 of the electrical connector 1-2. The closing part 221B is formed by increasing the plate thickness of the upper wall 221 of an electrical connector 1-1 by an amount corresponding to the plate thickness of the lower wall 222 of the electrical connector 1-2. This closing part 221B may not necessarily be formed integrally with the upper wall 221, and may be a plate-like spacer interposed between the upper wall and the lower wall 222. If the secondary catching is provided, the closing part 221B has the opening for secondary catching 221A formed therein for plugging the second catching portion 25 (FIG. 3) therethrough.

The position and length of the opening region 26 is set to enable the terminal 10 to be caught on the lance 24 while the electrical wire 3 connected to the terminal 10 is being plugged into the cavity 21. The opening region 26 extends from the vicinity of a front end of the lower wall 222 generally to the position of the core joining portion 121 of the terminal 10 accommodated in the cavity 21. If a rear end 26B of the opening region 26 is set at the position of the core joining portion 121 or the insulation joining portion 122 when the front end 10F of the terminal 10 contacts the lance 24, as shown in FIG. 6*b*, the terminal 10 is stably supported by the rear end 26B and its vicinity when the front end 10F of the terminal 10 contacts the lance 24. The electrical wire 3 is also stably supported by a rear end portion of the upper wall 221. This can contribute to stabilization of the operation of catching or securing the terminal 10 on the lance 24.

A front wall 23 is formed opposite to the front end 10F of the terminal 10, and forms the front end 21F of the cavity 21. The front wall 23 is opposite to a protrusion for locating 10A formed at the front end 10F. The front wall 23 has a plugging hole 23A (FIGS. 1 and 3) formed therein into which the mating terminal is plugged toward the front end 10F of the terminal 10. The plugging hole 23A passes through the front wall 23 in the mating direction z.

Among the components of the housing 20, the lance 24 is provided in the housing main body 201, and the front wall 23 forming the front end 21F of the cavity 21 is provided in the housing front portion 202. As the housing 20 is divided into two bodies, the housing main body 201 and the housing front portion 202, the lower wall 222 is also divided into a supporting portion 27 located at the front end 21F of the cavity 21 and in the vicinity thereof, and the remaining portion. The supporting portion 27 supports the front end 10F of the terminal 10, in front of the opening region 26, along with the front wall 23 and the lance 24. A slope 27A that guides the front end 10F of the terminal 10 to the front end 21F of the cavity 21 is formed on a rear end portion of the supporting portion 27. According to another embodiment, the housing 20 can be divided into the housing main body 201 and the housing front portion 202 at an appropriate position. For example, the supporting portion 27 may be provided to the housing main body 201.

<Assembly of Electrical Connector, Action and Effect of the Present Embodiment>

An exemplary procedure for assembling the electrical connector 1 will be described with reference to FIGS. 5 and 6*a*-6*c*. First, among the elements constituting the housing 20, the housing main body 201 and the housing front portion 202 are assembled together by engaging with each other engaging portions 201A, 202A provided on their respective sidewalls. Further, the electrical wire 3 is crimped to the electrical wire joining portion 12 of the terminal 10.

As shown in FIG. 6*a*, the terminal 10 having the electrical wire 3 joined thereto is plugged into the cavity 21 from a rear end of the housing main body 201, thereby beginning assembly of the terminal 10 to the housing 20. The terminal 10 and the electrical wire 3 are assembled with the housing 20 while being moved frontward or forward into the housing along the mating direction z by an assembling machine or by hand. It should be noted that, depending on the shape of a rear side of the cavity 21, the terminal 10 and the electrical wire 3 may also be plugged into the cavity 21 in a direction inclined with respect to the mating direction z.

The terminal 10 is plugged into the cavity 21 along the mating direction z, and moved frontward therethrough. FIG. 6*a* shows the terminal 10 plugged into the cavity 21 when the front end 10F has reached a position in the vicinity of the supporting end 24B of the lance 24. At this time, an upper end of the first caught portion 111 at the front end 10F or in the vicinity thereof is in contact with or close to the lance 24, and the insulation 3B of the electrical wire 3 is exposed behind the cavity 21.

Once the electrical wire 3 is moved to the front of the cavity 21 while the electrical wire 3 is being held behind the housing 20, the terminal 10 is gradually inclined with respect to the mating direction z, following the shape of the lance 24, as shown for example in FIG. 6*b*. In the example shown in FIG. 6*b*, once the upper end of the first caught portion 111 at the front end 10F or in the vicinity thereof is collided with the lance 24, the terminal 10 is inclined in a direction in which the front end is displaced downward and the rear end 10B is displaced upward with respect to an attitude of reference along the mating direction z, while the terminal and the electrical wire 3 are each supported by the wall 22. Following the inclination of the terminal 10, the electrical wire 3 is also inclined between the upper wall 221 and the lower wall 222. Once the terminal 10 and the electrical wire 3 are inclined with respect to the mating direction z, a portion of the terminal 10 on the front end 10F side lowers beyond an upper face of the lower wall 222 and is positioned in the opening region 26.

As the opening region 26 is present in the lower wall 222, the terminal 10 having come into contact with the lance 24 from behind is allowed to be displaced inclinedly with respect to the mating direction z. In the example shown in FIG. 6*b*, in the front end 10F side of the terminal 10, a region 10L lower than an imaginary line L1 indicating the upper face of the lower wall 222 is positioned in the opening region 26. A portion of the region 10L of the terminal 10 may be positioned outside the cavity 21 beyond the opening region 26 is a downward direction.

In the example shown in FIG. 6*b*, the terminal 10 is in contact with the lance 24 at a position near the free end 24F beyond an intermediate position between the supporting end 24B and the free end of the lance. At this time, as the front end 10F side of the terminal 10 is displaced to the outside of the cavity 21 by the presence of the opening region 26, the lance 24 is substantially unloaded, and not elastically deformed. As a result, when the electrical wire 3 is further moved frontward to press the lance 24 by the terminal 10 from behind, and the lance is elastically deformed upward by a small amount (ε1), the first catch portion 111 can climb frontward over the free end 24F that is a lower end of the lance. An elastic deformation amount ε1 at that time is indicated in FIG. 6*b*. A terminal plugging force required for obtaining the elastic deformation amount ε1 of the lance 24 is lower than the buckling load of the thin electrical wire 3, and therefore the electrical wire is not buckled.

Figure 6C:
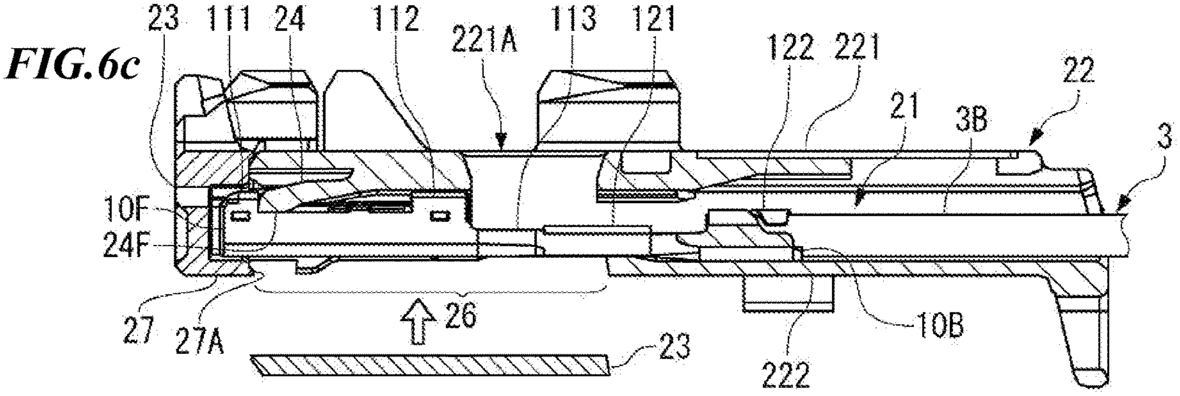
FIG. 6*c* is a diagram showing a step of the exemplary assembly process including plugging the terminal having an electrical wire joined thereto into the housing.

Once the first catch portion 111 climbs over the free end 24F, the front end 10F is guided to the front end 21F of the cavity 21 by the slope 27A of the supporting portion 27. The front end 10F of the terminal 10 is then accommodated in the front end 21F of the cavity 21, as shown in FIG. 6*c*. At this time, the terminal 10 is positioned in parallel with the mating direction z, and the first catch portion 111 is caught by the lance 24 that has returned to an unloaded or substantially-unloaded state behind the first caught portion.

After the terminal 10 is accommodated in the front end 21F of the cavity 21, the lid 203 is attached to the housing main body 201 and the housing front portion 202, thereby closing the opening region 26 with the lid. The lid 203 is engaged with the housing main body 201 and the housing front portion 202 by an engaging portion 203A (FIG. 5) provided at both ends of the lid in the lateral direction x.

When at least an area in the opening region 26 that is opposite to the free end 24F of the lance 24, and more preferably, an area in the opening region 26 that is opposite to an area from the free end 24F to the supporting end 24B of the lance 24, is closed by the lid 203 or the like, the displacement of the terminal 10 in a direction away from the lance 24 (downward) is restrained by the lid 203. Therefore, the terminal 10 is unlikely to be released from the lance 24 by an external force, such as vibration or an impact. Accordingly, the terminal 10 is stably supported in the cavity 21, and the mating state of the terminal and the mating terminal is stabilized.

In one advantageous embodiment, the space of the opening region 26 is occupied by the lid 203 or the like. In this way, even if the terminal 10 is displaced, such displacement stops at the position of the upper face of the lid 203 (the position of the upper face of the lower wall 222). Therefore, the terminal 10 is less likely to be released from the lance 24.

If the opening region 26 is not formed in the lower wall 222, it is necessary to press the lance 24 from behind by the terminal 10 from when the terminal 10 has come into contact with or has come close to the lance, as shown in FIG. 6*a*. Further, it is necessary to move the terminal 10 and the electrical wire 3 frontward in the mating direction z along the lower wall 222 until the first caught portion 111 climbs over the free end 24F while elastically deforming the lance 24 upward. An elastic deformation amount ε2 (shown in FIG. 6*a*) required of the lance 24 in that case is larger than the elastic deformation amount ε1 in the case where the opening region 26 is present. Accordingly, if the buckling strength of the electrical wire 3 is lower than a terminal plugging force equivalent to the elastic deformation amount ε2 because the diameter of the electrical wire 3 is small, plugging the electrical wire into the cavity so as to obtain the elastic deformation amount ε2 for the lance 24 will only result in buckling of the electrical wire 3. The terminal plugging force required is therefore not transmitted from the electrical wire 3 to the terminal 10, and the terminal cannot be assembled to the housing 20.

If the opening region 26 that allows the terminal 10 to be displaced inclinedly in a direction following the protruding direction of the lance 24 is formed in the housing 20, a portion of the terminal can be received in the opening region in the process of accommodating the terminal into the cavity. Therefore, the degree of freedom of the attitude of the terminal 10 is increased. Consequently, when the lance 24 is given the elastic deformation amount ε1 that is small as compared with the case where the terminal 10 enclosed by the wall 22 is kept in an attitude along the mating direction z throughout the accommodating process, the terminal can be caught on the lance 24. Thus, the terminal 10 can be assembled into the housing 20 with a plugging force required for deflecting the lance 24 by the elastic deformation amount ε1 while plugging the electrical wire 3 into the cavity 21 with a force within the range of the buckling load.

<Assembly of the Stack>

As set forth above, if necessary, two or more electrical connectors 1 are stacked one on top of another. An assembly process of the stack 100 including the three electrical connectors 1-1, 1-2, 1-3, as shown in FIG. 2*a*, can be performed under the following procedure.

First, the electrical connectors 1-1, 1-2, 1-3 are each assembled by assembling the terminal 10 to the housing 20 using the opening region 26 as described above. The opening region 26 of the lowermost electrical connector 1-3 is closed by the lid 203. Next, the electrical connectors 1-1, 1-2, 1-3 are sequentially stacked one on top of another. The electrical connectors 1-1, 1-2, 1-3 are assembled to each other by catching a catching claw 28 (FIG. 3) provided on the housing 20 onto a complementary catching portion provided in the housing 20 in the adjacent housing surface. The opening region 26 of the electrical connector 1-2 is closed by the closing part 221B of the upper wall 221 of the electrical connector 1-3. Similarly, the opening region 26 of the electrical connector 1-1 is closed by the closing part 221B of the upper wall 221 of the electrical connector 1-2. In addition, the terminal 10 of the electrical connector 1-3 is caught from behind by the second catching portion 25 provided on the lower wall 222 of the electrical connector 1-2. The terminal 10 of the electrical connector 1-2 is caught from behind by the second catching portion 25 provided on the lower wall 222 of the electrical connector 1-1. The terminal 10 of the uppermost electrical connector 1-1 is caught from behind by the second catching portion 25 provided on an element, not shown, stacked on the electrical connector 1-1. The terminal 10 may be assembled into the housing main body 201 with the housing front portion 202 not yet assembled thereto. Thereafter, the housing main body 201 having the terminal 10 assembled thereto and the housing front portion 202 may be assembled to each other.

The electrical connector 1 may not necessarily be provided with a secondary catching structure. If the electrical connector 1 is not provided with the second catching portion 25 that is plugged into the cavity 21 in the adjacent layer and secondarily catches the terminal 10, the terminal may be assembled to the connectors 1-1, 1-2, 1-3 in the respective layers after the electrical connectors are stacked one on top of another. At that time, even when the opening region 26 is planarly closed by the upper wall 221 in the lower layer positioned immediately below the opening region 26, as long as a space that can receive the terminal 10 is left in at least a portion of the opening region 26 in the thickness direction, the terminal can be caught on the lance 24 and assembled to the housing 20 without causing buckling of the electrical wire 3.

MODIFICATIONS

Figure 8A:
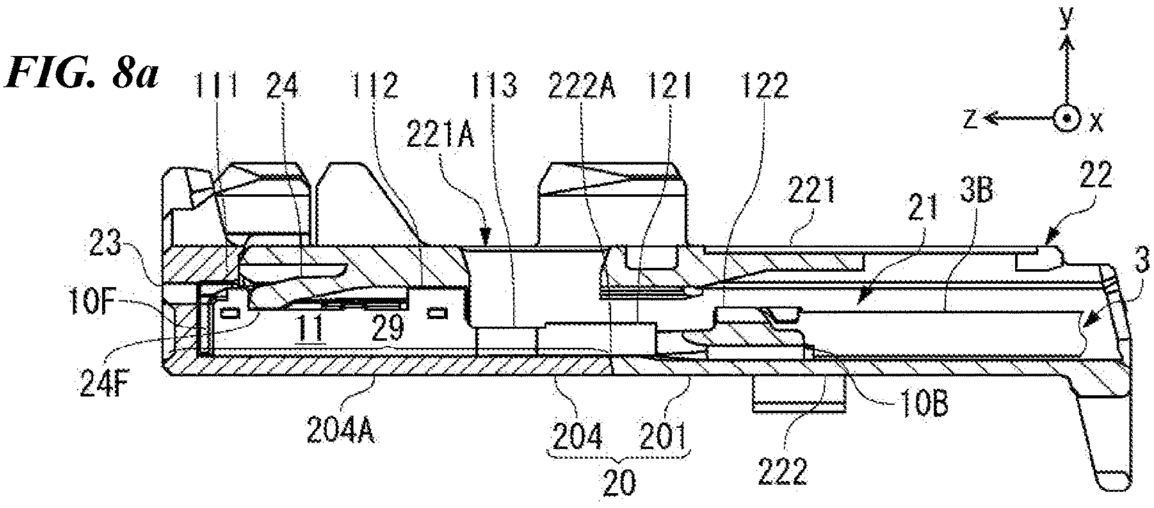
FIG. 8*a* is a vertical sectional view of an electrical connector according to a first modification of the present invention.

Modifications of the electrical connector of the present invention will be described below. Components similar to those of the above embodiments are denoted by the same reference signs. The above described embodiments and the following modifications can be combined appropriately, as would be understood by one of ordinary skill in the art. A housing 20 of the electrical connector shown in FIG. 8*a* is provided with a first housing 201 equivalent to the housing main body 201 of the above embodiment, and a second housing 204 formed by integrating the housing front portion 202 and the lid 203 of the above embodiment.

Figure 8B:
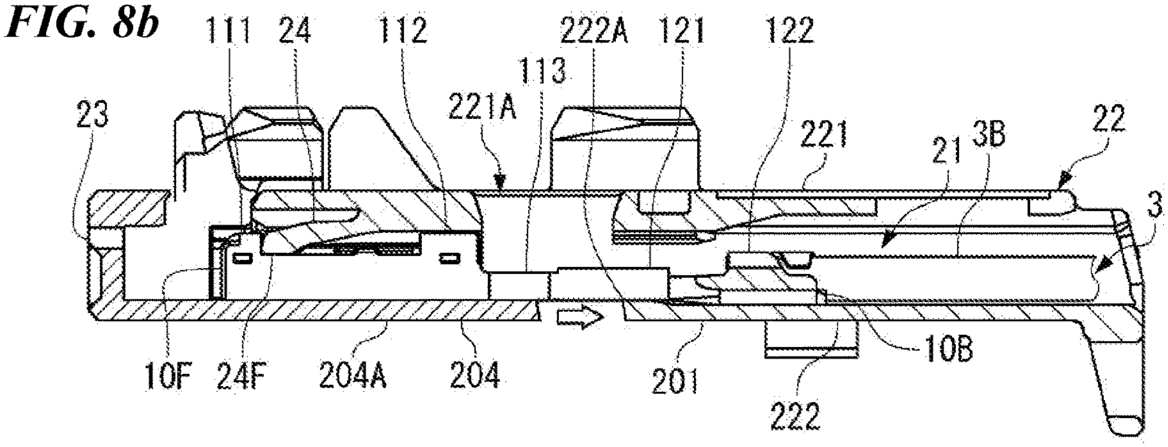
FIG. 8*b* is a vertical section view showing an assembly process of the electrical connector of FIG. 8*a*.

When the second housing 204 is not assembled to the first housing 201, a space in front of a front end 222A of a lower wall 222 of the first housing 201 is equivalent to an opening region 29 present at a position opposite to a lance 24 in a protruding direction of the lance. The opening region 29 extends frontward from the front end 222A set at the position of a core joining portion 121 when a terminal 10 is accommodated in the housing 20. When the second housing 204 is not assembled to the first housing 201, a portion of the terminal 10 that has come into contact with the lance 24 from behind can be received in the opening region 29. Therefore, the terminal plugging force can be reduced, and the electrical wire 3 can be assembled to the housing 201 even when it is a thin wire. After the terminal 10 is assembled to the first housing 201, the second housing 204 is assembled to the first housing from the front of the first housing, as shown in FIG. 8*b*, thereby closing the opening region 29 with a lid 204A of the second housing 204.

Figure 8C:
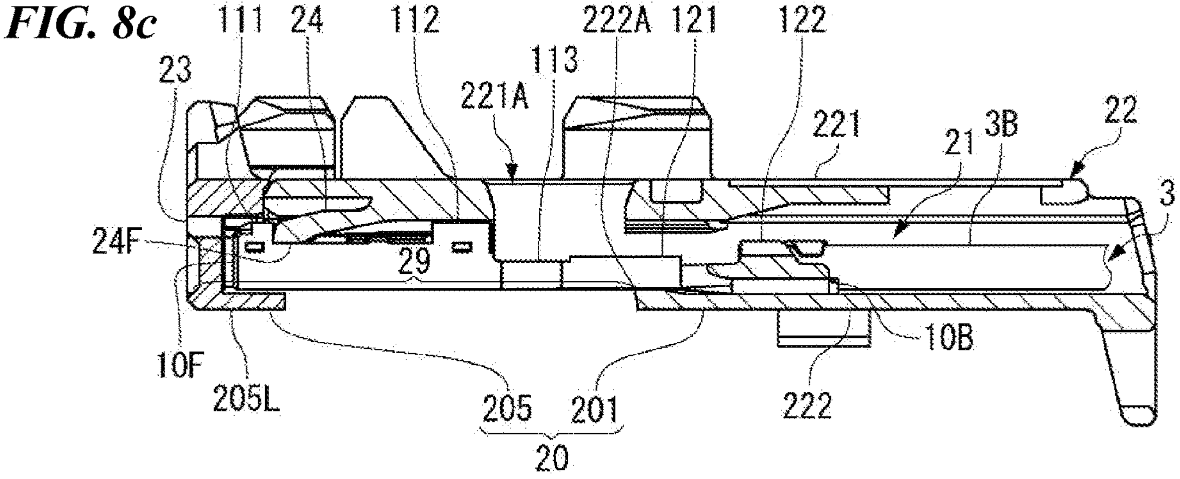
FIG. 8*c* is a vertical sectional view of an electrical connector according to a second modification of the present invention.

FIG. 8*c* shows an example where, in the opening region 29, a minimum area required for preventing the terminal 10 from being released from the lance 24 by vibration and/or an impact, or only a spot opposite to a free end 24F of the lance 24, is closed by a second housing 205. A lower wall 205L of the second housing 205 is extended rearward as compared with the supporting portion 27 (FIG. 3) of the above embodiment, and thus doubles as a lid 203. Preferably, the terminal 10 is assembled to the first housing 201, with the opening region 29 opened outside the cavity 21, before the second housing 205 is assembled to the first housing.

Figure 7C:
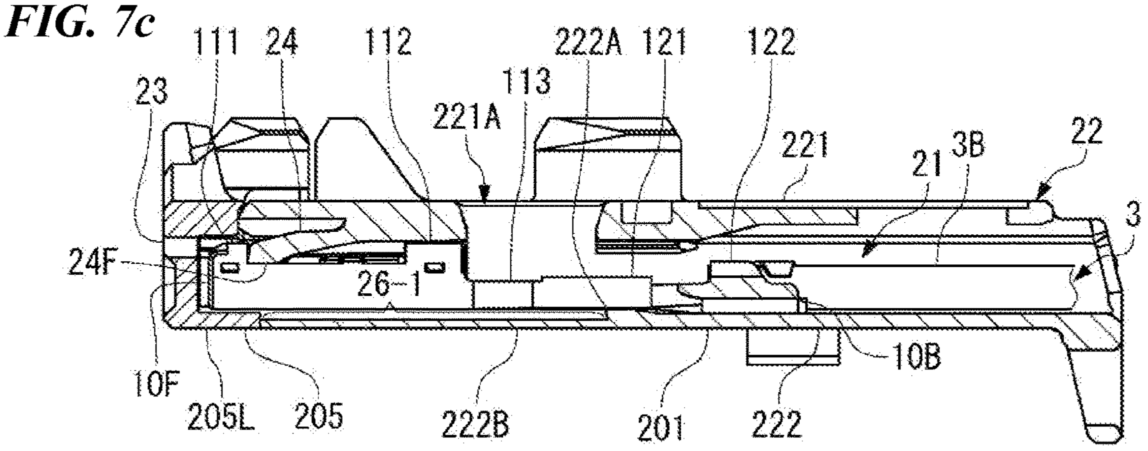
FIG. 7*c* is a diagram showing a modification of the opening region of FIGS. 7*a* and 7*b*.

FIG. 7*c* shows an opening region 26-1 not passing through the lower wall 222 in the plate thickness direction. The opening region 26-1 is formed in a thin-walled part 222B of the lower wall 222. The thin-walled part 222B is depressed downward from an upper face of a peripheral region of the lower wall 222. The opening region 26-1 is present between the upper face of the peripheral region and an upper face of the thin-walled part 222B. This opening region 26-1 can also receive a portion of the terminal 10 when the terminal climbs over the lance 24, and enables the terminal to be caught on the lance with a terminal plugging force lower than the buckling load of the electrical wire 3.

Figure 9A:
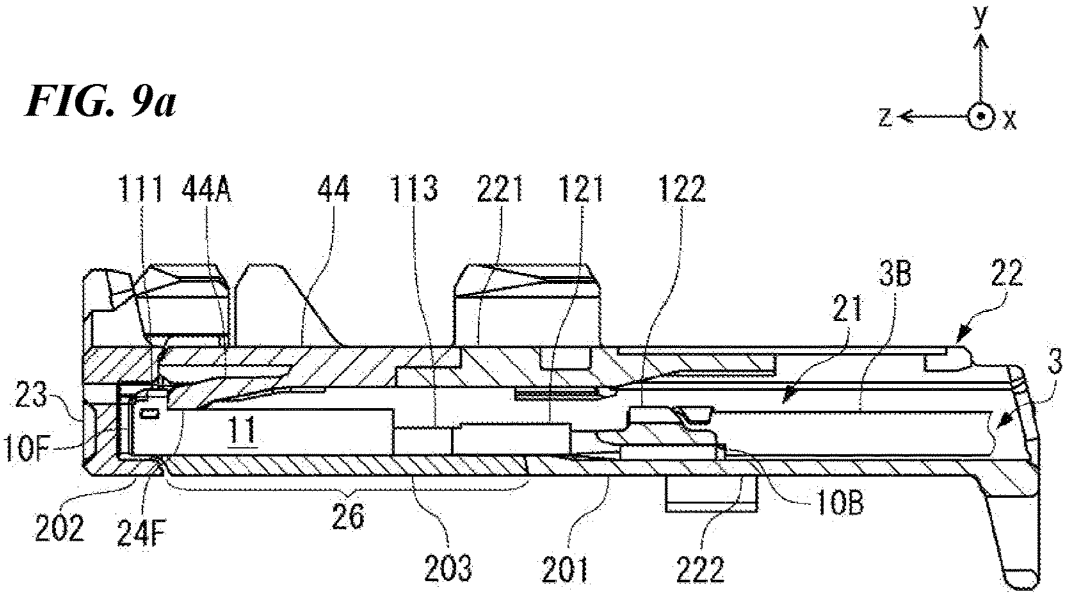
FIG. 9*a* is a vertical sectional view of an electrical connector according to a third modification of the present invention.

A configuration shown in FIG. 9*a* enables the terminal plugging force to be adjusted according to the dimensions/shape of a lance element 44. It should be noted that FIG. 9*a* shows an electrical connector not provided with a secondary catching structure. The lance element 44 is separate from the housing 20, and removably fixed to the upper wall 221. Other than the lance element 44, an appropriate lance element having a rigidity that establishes the condition (electrical wire buckling strength>terminal plugging force) may be selected, for example on the basis of a dimension such as length in the mating direction z, thickness or width, or a material, a shape, or the like, and be fixed to the housing 20.

For example, a lance 44A of the lance element 44 is longer in the mating direction z than the lance 24 of the above embodiment (FIG. 3). Therefore, a terminal plugging force required for obtaining the same elastic deformation amount ε1 can be reduced as compared with the case where the lance 24 is deflected to catch the terminal 10 on the lance. Selection of the lance element fixed to the housing 20 enables various electrical wires 3 different in diameter or material to be employed in the electrical connector.

Figure 9B:
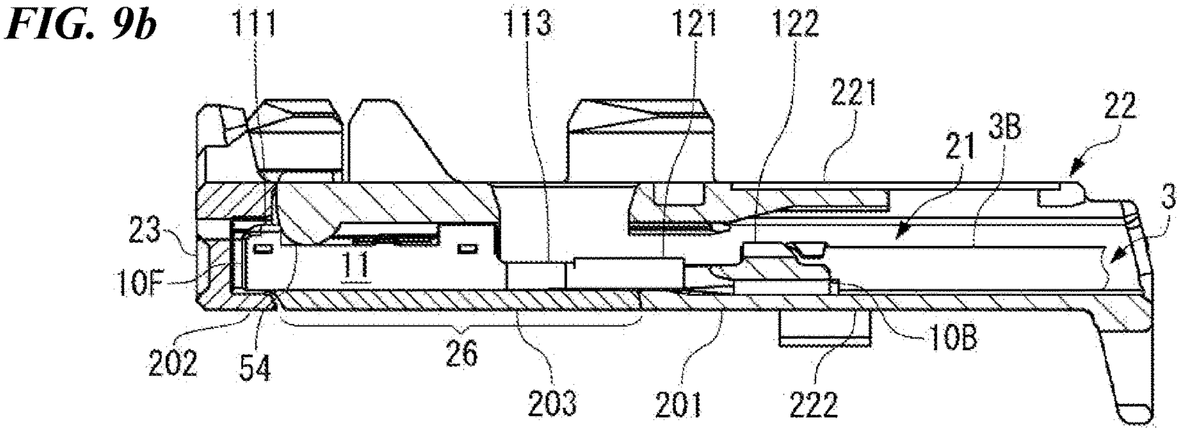
FIG. 9*b* is a vertical sectional view of an electrical connector according to a fourth modification of the present invention.

FIG. 9*b* shows an electrical connector in which a catching portion 54 is employed in place of the lance 24. The catching portion 54, like the lance 24, protrudes into the cavity 21 from the upper wall 221, and catches the first catch portion 111 of the terminal 10. As the opening region 26 is present that allows the terminal 10 to be displaced inclinedly with respect to the mating direction z, the terminal can be caught on the catching portion 54 while the terminal 10 is permitted to circumvent the catching portion 54, without necessarily deflecting the catching portion in its protruding direction.

Other than the above, a selection may be made from among the configurations mentioned in the above embodiment, or an appropriate change may be made from one configuration to another, unless such selection or change departs from the spirit of the present invention.

The lid 203 may not necessarily be separate from the first housing and the second housing. For example, the lid 203 may be attached to the housing main body 201 by a hinge or the like.

The wall 22 forming the cavity 21 can be formed into an appropriate shape that can support the terminal 10. For example, if the terminal 10 has a circular cross section, the wall 22 can also be made circular in cross section.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. An electrical connector, comprising:
- a terminal, including
  - a terminal portion extending in a mating direction in which the terminal is mated with a mating terminal; and
  - an electrical wire joining portion extending rearward behind the terminal portion and adapted to be joined to an electrical wire; and
- a housing, including:
  - a cavity receiving the terminal therein along the mating direction with a front end of the terminal facing frontward;
  - a wall supporting the terminal;
  - a catching portion protruding into the cavity and securing the terminal within the cavity, the terminal includes a first catch portion engaging with the catching portion of the housing and a second catch portion adapted to engage with a second catching portion of an adjacent electrical connector; and
  - an opening formed at a position opposite to the catching portion in a protruding direction of the catching portion.

2. The electrical connector according to claim 1, wherein the housing includes:
- a first housing including the catching portion; and
- a second housing separate from the first housing and defining a front end of the cavity.

3. The electrical connector according to claim 1, further comprising a lid selectively closing at least a portion of the opening.

4. The electrical connector according to claim 3, wherein at least a portion of the opening is closed in a thickness direction of the wall by the lid.

5. The electrical connector according to claim 1, wherein the housing further includes:
- a front wall forming a front end of the cavity and having a hole into which the mating terminal is plugged toward the front end of the terminal; and
- a supporting portion supporting the front end of the terminal in front of the opening along with the front wall and the catching portion.

6. The electrical connector according to claim 5, wherein the supporting portion defines a slope formed thereon guiding the front end of the terminal to the front end of the cavity.

7. The electrical connector according to claim 1, wherein the catching portion comprises a lance formed as a cantilever.

8. The electrical connector according to claim 7, wherein the lance is removably fixed to the wall.

9. The electrical connector according to claim 1, wherein the housing further includes a top wall defining an opening formed therethrough, the opening aligned with the second catch portion of the terminal and sized to receive the second catching portion of the adjacent electrical connector.

10. The electrical connector according to claim 9, wherein the first and second catch portions of the terminal extend toward the top wall from the terminal portion.

11. An electrical connector stack comprising:
a first electrical connector; and
a second electrical connector separate from the first electrical connector and arranged over the first electrical connector, each of the first and second electrical connectors including:
a terminal having a terminal portion extending in a mating direction and an electrical wire joining portion extending rearward from the terminal portion and adapted to be joined to an electrical wire; and
a housing, including:
a cavity receiving the terminal therein along the mating direction with a front end of the terminal facing frontward;
a wall supporting the terminal;
a catching portion protruding into the cavity and securing the terminal within the cavity; and
an opening formed at a position opposite to the catching portion in a protruding direction of the catching portion, wherein the housing of the first electrical connector closes at least a portion of the opening of the second electrical connector.

12. The electrical connector stack according to claim 11, wherein the terminal includes:
a first catch portion engaging with the catching portion of the housing of the first electrical connector; and
a second catch portion engaging with a second catching portion provided on the housing of the second electrical connector.

13. The electrical connector stack according to claim 11, further comprising a lid selectively closing the opening of the first electrical connector.

14. An electrical connector comprising:
a terminal; and
a housing, including:
a cavity receiving the terminal therein along a mating direction with a front end of the terminal facing frontward;
a wall supporting the terminal;
a catch protruding into the cavity and securing the terminal within the cavity, the terminal includes a first catch portion engaging with the catch of the housing and a second catch portion adapted to engage with a catch of an adjacent electrical connector; and
an opening formed through the wall and opposite to the catch.

15. The electrical connector according to claim 14, wherein the housing further includes a top wall defining an opening formed therethrough, the opening aligned with the second catch portion of the terminal and sized to receive the catch of the adjacent electrical connector.

16. The electrical connector according to claim 14, further comprising a wire attached to a rear end of the terminal and at least partially arranged within the cavity.

17. The electrical connector according to claim 14, wherein the housing further includes:
a front wall forming a front end of the cavity and having a hole into which the mating terminal is plugged toward the front end of the terminal; and
a supporting portion supporting the front end of the terminal in front of the opening along with the front wall and the catch.

18. The electrical connector according to claim 17, wherein the supporting portion defines a slope formed thereon guiding the front end of the terminal to the front end of the cavity.

* * * * *